May 2, 1967  J. B. HUFF  3,317,825

THREE-WIRE GROUND TYPE ELECTRICAL RECEPTACLE TESTER

Filed Oct. 14, 1964

INVENTOR.
JAMES B. HUFF

BY
ATTORNEYS 3,317,825
THREE-WIRE GROUND TYPE ELECTRICAL
RECEPTACLE TESTER
James B. Huff, 3205 Tucker Drive NW.,
Huntsville, Ala. 35810
Filed Oct. 14, 1964, Ser. No. 403,958
3 Claims. (Cl. 324—51)

The invention described herein may be manufactured and used by or for the Government of the United States of America for governmental purposes without the payment of any royalties thereon or therefor.

This invention relates to a simple, fool-proof instrument for testing 120-volt three-wire ground type electrical receptacles and, more particularly, to a testing device that indicates immediately upon being inserted into such a three-prong receptacle whether or not the receptacle is wired correctly and, if not, the corrective steps that need to be taken.

As is well known, most present day building codes or standards require that all 120-volt electrical receptacles installed in a dwelling or business establishment be of the three-prong type to provide a safe ground circuit in case of an electrical failure either within the equipment deriving power from the receptacle or the receptacle itself. Although this requirement is necessary from a standpoint of safety, it nevertheless makes the installation of electrical receptacles a much more tedious undertaking than was the case when a two-prong receptacle could be used since the hot, neutral and ground conductors must be connected to a predetermined terminal and not at random. In fact, any error made in installing such three-prong receptacles can result in a very lethal condition being brought into existence. For example, if the receptacle housing or neutral plug is inadvertently connected to the hot lead, or the neutral or ground wire is accidently broken or left unconnected, a very severe if not a fatal electrical shock can result.

Thus, to assure that no three-prong, 120-volt receptacles are incorrectly wired, all such receptacles must be checked before a buildings electrical system is certified safe and electrical power is permanently "turned on". Such final testing has heretofore been a rather complicated procedure involving the use of elaborate, costly equipment and requiring the attention of a highly skilled technician. With this in mind it is readily seen that the checking out of a large structure, such as a modern office building having many hundred three-prong receptacles, is an expensive and laborious undertaking.

According to this invention, it has been found that an inexpensive portable hand-held test instrument can be produced for determining the precise wired condition of a three-wire, 120-volt receptacle in one simple operation. This test instrument consists of three electrical indicators which are selectively connected to the prongs of a polarized plug in such a manner that various combinations of the indicators will be energized depending on the wired condition of the receptacle into which the plug is inserted, thus indicating the wiring condition of the receptacle.

Therefore, the primary object of this invention is to provide a test instrument for indicating the exact wiring arrangement of a three-prong electrical receptacle.

Another object of this invention is to provide an inexpensive hand-held test instrument which, when inserted into a three-wire grounded 120-volt receptacle, will indicate if the receptacle is correctly wired and, if not, the error present in the wired connections.

Yet another object of this invention is to provide a test instrument having the above mentioned desirable characteristics which can be properly used by an individual having no previous training in testing the electrical wiring of three-prong receptacles.

These and other objects and advantages of this invention will be more apparent upon reference to the following specification, appended claims, and drawings wherein:

Figure 1:
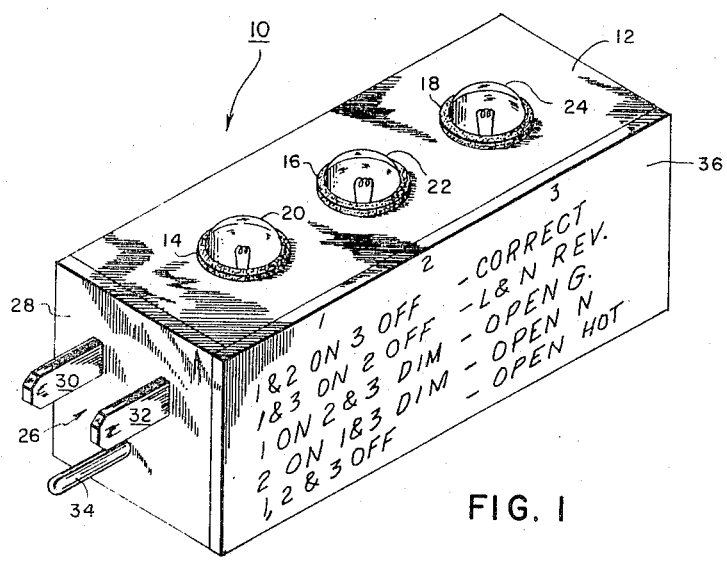
FIGURE 1 is a perspective view of one configuration in which a hand-held test instrument constructed in accordance with this invention can be formed.
Figure 2:
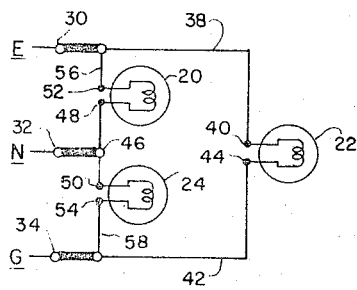
FIGURE 2 is a schematic diagram showing the test instrument plugged into a three-wire grounded 120-volt receptacle that has been properly wired.

With continued reference to the accompanying figures wherein like numerals designates similar parts throughout the various views, and with initial attention directed to FIGURE 1, reference numeral 10 designates a portable, hand-held three-wire receptacle testing instrument constructed in accordance with this invention. This testing instrument 10 consists of a support 12 in the form of a hollow housing which may be constructed of any suitable non-conductive insulative material such as plastic or wood. Three apertures 14–18 are formed in one side of the hollow housing 12 through which three indicating devices 20–24 can be viewed, or if preferred mounted in a projecting manner so that they are readily visible by the individual using the test instrument. Preferably the indicator devices are small incandescent lamps or electrical bulbs of the neon or 120-volt type that have their dome shaped ends mounted in their respective apertures. Obviously, however, other types of indicating devices such as meter movements could be used if such were desirable.

A standard type three-prong, 120-volt polarized electrical plug 26 is securely mounted on one end 28 of the housing 12 and each prong or blade 30–34 of the plug, which serve as binding posts for the indicator devices, is electrically connected to various ones of the electrical indicators 20–24 in a manner that will be more fully explained hereinafter. For convenience in using the test instrument and depicting the wired condition of the receptical being tested, a reference plate 36, which has an indicator code printed or engraved thereon with all the possible lighting sequences of the three indicators 20–24 and the type of receptacle wiring that would be required to produce each such indicated condition, is mounted or formed on the side of the housing 12. This plate 36 preferably forms one wall of the housing 12 and is readily removable therefrom to permit access to the interior of the housing and the electrical components mounted therein.

To test the electrical wiring of a standard three-wire grounded type 120-volt electrical receptacle it is only necessary that the plug 26 of the testing device 10 be pushed into the receptacle under test in the same manner any electrical plug would be inserted therein. Due to the construction of the receptacle and the plug 26 there is no chance the testing device can be inserted in an incorrect manner into the receptacle.

The operation of the three-prong receptacle testing device can be explained in the following manner:

Assuming that the receptacle being tested is correctly wired, the live or hot lead E will be connected through the binding post or prong 30 and electrical conductor 38 to one terminal 40 of the indicator bulb 22. The ground lead G is connected through the binding post or prong 34 and conductor 42 to the second terminal 44 of the bulb 22. Neutral lead N is connected through the binding post or prong 32 and conductor 46 to the terminals 48–50 of the bulbs 20 and 24, respectively. The second terminals 52–54 of bulb 20 and 24 are connected through conductors 56–58 to the prongs 30 and 34, respectively, of plug 26. As will be apparent, with the receptacle correctly wired bulbs 20 and 22 will glow at full brilliance while no current will flow through bulb 24 and it will thus remain off.

Figure 3:
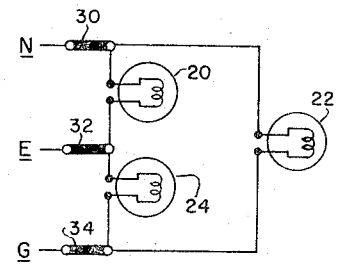
FIGURE 3 is a diagram similar to FIGURE 2 but illustrating the test instrument inserted into a receptacle in which the live (hot leg) and neutral conductors have been inadvertently connected in reverse.

As seen in FIGURE 3, if the hot lead E and neutral lead N are inadvertently reversed, bulbs 20 and 24 will glow as current flows from the lead E into both the neutral lead N and ground lead G. However, no current will flow through bulb 22 since the neutral lead N and ground lead G are at the same potential and it will, therefore, remain off. By referring to the engraving on plate 36 (FIGURE 1), the individual using the test instrument 10 will be given a clear indication that the hot and neutral leads are incorrectly connected within the receptacle and must be reversed before the receptacle can be safely placed in use.

Figure 4:
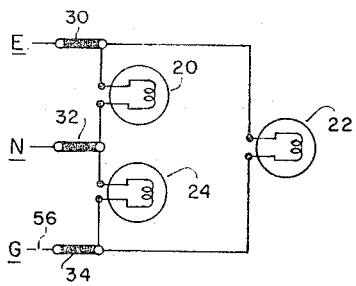
FIGURE 4 illustrates the test instrument inserted into a receptable having an open break or disconnection in the ground conductor.

FIGURE 4 illustrates a receptacle under test in which the ground lead G is open or disconnected at point 56. This results in bulb 20 glowing at full brilliance while bulbs 22–24, which are effectively in series between the prong 30 (or hot lead E) and the prong 32 (or neutral lead N), glows rather dimly. Again this combination of glowing bulbs indicates both that a corrective step must be taken before the receptacle is ready for use and what that corrective step is.

Figure 5:
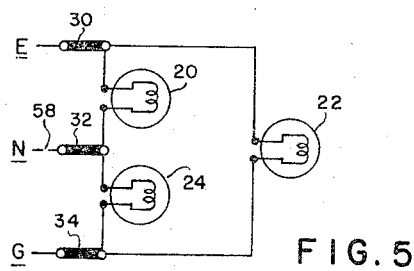
FIGURE 5 is a schematic diagram showing the test instrument plugged into a receptacle having an open break or disconnection in the neutral conductor.

In those instances where the neutral lead N is open or disconnected, as shown at 58 in FIGURE 5, the bulbs 20 and 24 will be in series and thereby glow rather dimly while bulb 22 will be directly across the hot and ground leads and thus will glow at full brilliance. As will be apparent, should no bulbs glow then an open or disconnection in the hot lead E would be indicated.

From the foregoing it can be seen that the time and expense of testing three-prong, 120-volt receptacles can be reduced by at least a factor of four whenever this novel testing instrument is employed. By simply inserting this test instrument into a receptacle, an immediate indication is given of the wiring condition of the receptacle as well as any corrective measures that need to be taken to correct the circuit. Furthermore, due to the simplicity of the testing instrument and its total foolproof manner of operation, no highly skilled technician need be used to properly test receptacles as was heretofore necessary thereby further reducing the expense formerly encountered in checking out newly wired buildings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A test instrument for testing the wired condition of a three-wire ground type electrical receptacle having a normally energized post, a normally neutral post and a normally grounded post comprising:
    (a) a portable, hand-held insulative housing;
    (b) a polarized three prong electric plug for insertion into said receptacle, including, first, second and third binding post means said binding post means comprising the three prongs respectively of said electrical plug mounted on said housing and extending through the walls thereof;
        (1) said first binding post means connected to the normally energized post of said receptacle,
        (2) said second binding post means connected to the normally neutral post of said receptacle and,
        (3) said third binding post means connected to the normally grounded post of said receptacle when the three prongs of said polarized plug are inserted in said receptacle;
    (c) first, second and third electric lamps visibly mounted on said housing;
        (1) said first electric lamp directly connected between said first and second binding post means.
        (2) said second electric lamp directly connected between said second and third binding post means, and
        (3) said third electric lamp directly connected between said first and third binding post means whereby selected ones of said electric lamps according to the wired condition of the receptacle being tested are energized when the test instrument is connected to the receptacle thus indicating the manner in which said receptacle is wired.

2. A test instrument according to claim 1 wherein said first, second and third electric lamps are incandescent lamps.

3. A test instrument according to claim 2 wherein said housing means has an indicator code placed thereon for depicting the wired condition of the receptacle being tested in accordance with which incandescent lamps are energized.

References Cited by the Applicant

UNITED STATES PATENTS 2,598,775  6/1952  Fischer _____ 324—66

FOREIGN PATENTS 807,544  1/1959  Great Britain.

WALTER L. CARLSON, *Primary Examiner.*

G. R. STRECKER, *Assistant Examiner.*